(12) United States Patent
Bravyi et al.

(10) Patent No.: US 11,200,360 B1
(45) Date of Patent: Dec. 14, 2021

(54) SYNTHESIS OF A QUANTUM CIRCUIT

(71) Applicant: International Business Machines Corporation, Armonk, NY (US)

(72) Inventors: Sergey Bravyi, Ossining, NY (US); Andrew W. Cross, Yorktown Heights, NY (US); Shelly-Erika Garion, Haifa (IL); Dmitri Maslov, New Canaan, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/897,827

(22) Filed: Jun. 10, 2020

(51) Int. Cl.
| | |
|---|---|
| *G06F 30/00* | (2020.01) |
| *G06F 30/327* | (2020.01) |
| *G06N 10/00* | (2019.01) |
| *G06F 30/392* | (2020.01) |
| *G06F 119/02* | (2020.01) |
| *G06F 111/02* | (2020.01) |

(52) U.S. Cl.
CPC .......... *G06F 30/327* (2020.01); *G06F 30/392* (2020.01); *G06N 10/00* (2019.01); *G06F 2111/02* (2020.01); *G06F 2119/02* (2020.01)

(58) Field of Classification Search
CPC .. G06F 2119/02; G06F 30/327; G06F 30/392; G06F 2111/02; G06N 10/00
See application file for complete search history.

(56) References Cited

U.S. PATENT DOCUMENTS

| | | | |
|---|---|---|---|
| 8,423,986 B1 * | 4/2013 | Grechanik | G06F 11/3414 717/154 |
| 9,633,313 B2 * | 4/2017 | Svore | B82Y 10/00 |
| 10,664,249 B2 * | 5/2020 | Amy | G06F 8/436 |
| 10,740,689 B2 * | 8/2020 | Kliuchnikov | G06N 10/00 |
| 2006/0123363 A1 * | 6/2006 | Williams | G06N 10/00 716/101 |

(Continued)

OTHER PUBLICATIONS

Xue et al.; "Benchmarking Gate Fidelities in a Si/SiGe Two-Qubit Device"; American Physical Society; Apr. 18, 2019; p. 021011-1-021011-12.*

(Continued)

*Primary Examiner* — Naum Levin
(74) *Attorney, Agent, or Firm* — Amin, Turocy & Watson, LLP

(57) ABSTRACT

Systems, computer-implemented methods, and computer program products to facilitate synthesis of a quantum circuit are provided. According to an embodiment, a system can comprise a memory that stores computer executable components and a processor that executes the computer executable components stored in the memory. The computer executable components can comprise a circuit generation component that generates, iteratively, quantum circuits from 1 to N two-qubit gates, wherein at least one or more iterations (1, 2, . . . , N) adds a single two-qubit gate to circuits from a previous iteration based on using added single 2-qubit gates that represent operations distinct from previous operations relative to previous iterations. The computer executable components can further comprise a circuit identification component that identifies, from the quantum circuits, a desired circuit that matches a quantum circuit representation.

15 Claims, 10 Drawing Sheets

(56) References Cited

U.S. PATENT DOCUMENTS

| | | | |
|---|---|---|---|
| 2018/0225586 A1* | 8/2018 | Chow | G06N 10/00 |
| 2019/0095561 A1* | 3/2019 | Pednault | G06N 10/00 |
| 2019/0121921 A1* | 4/2019 | Nam | G06N 10/00 |
| 2019/0332731 A1* | 10/2019 | Chen | G06F 30/00 |
| 2020/0134107 A1* | 4/2020 | Low | G06N 10/00 |
| 2020/0192417 A1* | 6/2020 | Fernandes Ramos | G06F 1/06 |
| 2021/0065037 A1* | 3/2021 | Wiebe | G06N 5/022 |

OTHER PUBLICATIONS

Amy et al., "On the CNOT-Complexity of CNOT-Phase Circuits," Quantum Science and Technology 4.1, arXiv:1712.01859v2 [quant-ph], Aug. 13, 2018, 21 pages.

Younis et al., "QFAST: Quantum Synthesis Using a Hierarchical Continuous Circuit Space," arXiv:2003.04462v1 [quant-ph], Mar. 9, 2020, 23 pages.

Meuli et al., "SAT-based {CNOT, T} quantum circuit synthesis," International Conference on Reversible Computation, 2018, 13 pages.

Garion et al., "On the Structure of the CNOT-Dihedral Group," Dec. 25, 2019, 11 pages.

Mell et al., "The NIST Definition of Cloud Computing," Recommendations of the National Institute of Standards and Technology, NIST Special Publication 800-145, Sep. 2011, 7 pages.

Aaronson et al., "Improved Simulation of Stabilizer Circuits," Phys. Rev. A 70, 052328, arXiv:quant-ph/0406196, 2004, 15 pages.

Amy et al., "A meet-in-the-middle algorithm for fast synthesis of depth-optimal quantum circuits," IEEE Transactions on Computer-Aided Design of Integrated Circuits and Systems, arXiv:1206.0758 [quant-ph], Jan. 28, 2013, 23 pages.

Cross et al., "Scalable randomized benchmarking of non-Clifford gates," npj Quantum Information 2, arXiv:1510.02720 [quant-ph], Oct. 8, 2015, 9 pages.

C'Orcoles et al., "Process verification of two-qubit quantum gates by randomized benchmarking," Version 2, Phys. Rev. A 87, arXiv:1210.7011 [quant-ph], Nov. 5, 2012, 9 pages.

Gottesman, "Stabilizer Codes and Quantum Error Correction," arXiv:quant-ph/9705052, Thesis, In Partial Fulfillment of the Requirements for the Degree of Doctor of Philosophy, California Institute of Technology, May 21, 1997, 122 pages.

Kliuchnikov et al., "Optimization of Clifford Circuits," Phys. Rev. A 88, arXiv:1305.0810 [quant-ph], Nov. 10, 2013, 8 pages.

Magesan et al., "Robust randomized benchmarking of quantum processes," Phys. Rev. Lett. 106, arXiv:1009.3639 [quant-ph], Oct. 22, 2018, 5 pages.

Magesan et al., "Characterizing Quantum Gates via Randomized Benchmarking," Phys. Rev. A 85, arXiv:1109.6887 [quant-ph], Apr. 27, 2012, 19 pages.

Maslov et al., "Shorter stabilizer circuits via Bruhat decomposition and quantum circuit transformations," IEEE Transactions on Information Theory, arXiv:1705.09176 [quant-ph], Jun. 23, 2018, 10 pages.

Nielsen et al., "Quantum Computation and Quantum Information: 10th Anniversary Edition," 710 pages.

Gosset et al., "An algorithm for the T-count," Quantum Information and Computation archive, vol. 14, Issue 15-16, arXiv:1308.4134v1 [quant-ph], 2014, 12 pages.

Heyfron et al., "An Efficient Quantum Compiler that Reduces T Count," Quantum Sci. Technol. 4, arXiv:1712.01557v3 [quant-ph], 2019, 19 pages.

Nam et al., "Automated optimization of large quantum circuits with continuous parameters," Quantum Information, arXiv:1710.07345v2 [quant-ph], Jun. 1, 2018, 21 pages.

Glaudell et al., "Optimal Two-Qubit Circuits for Universal Fault-Tolerant Quantum Computation," arXiv:2001.05997 [quant-ph], Jan. 16, 2020, 24 pages.

Amy et al., "A Finite Presentation of CNOT-Dihedral Operators," 14th International Conference on Quantum Physics and Logic, arXiv:1701.00140v5 [quant-ph], 2018, pp. 84-97, 14 pages.

Amy et al., "T-count optimization and Reed-Muller codes," IEEE Transactions on Information Theory, arXiv:1601.07363 [quant-ph], 2019, 19 pages.

Bombin, "Gauge Color Codes: Optimal Transversal Gates and Gauge Fixing in Topological Stabilizer Codes," New Journal of Physics, arXiv:1311.0879 [quant-ph], 2015, 10 pages.

Bombin et al. "Topological Computation without Braiding," Phys. Rev. Lett. 98, arXiv:quant-ph/0610024, 2007, 4 pages.

Bravyi et al., "Classification of topologically protected gates for local stabilizer codes," Phys. Rev. Lett. 110, arXiv:1206.1609 [quant-ph], Jun. 11, 2012, 6 pages.

Campbell et al., "Unifying gate-synthesis and magic state distillation," Phys. Rev. Lett. 118, arXiv:1606.01906 [quant-ph], Jan. 4, 2017, 5 pages.

Carignan-Dugas et al., "Characterizing Universal Gate Sets via Dihedral Benchmarking," Phys. Rev. A 92, arXiv:1508.06312 [quant-ph], Jul. 26, 2018, 5 pages.

Gottesman et al., "Quantum Teleportation is a Universal Computational Primitive," Nature 402, arXiv:quant-ph/9908010. Aug. 2, 1999, 6 pages.

Jochym-O'Conner et al., "The disjointness of stabilizer codes and limitations on fault-tolerant logical gates," Phys. Rev. X 8, arXiv:1710.07256 [quant-ph], 2018, 11 pages.

Magesan et al., "Efficient measurement of quantum gate error by interleaved randomized benchmarking," Phys. Rev. Lett. 109, arXiv:1203.4550 [quant-ph], 2012, 5 pages.

McKay et al., "A universal gate for fixed-frequency qubits via a tunable bus," Phys. Rev. Applied 6, arXiv:1604.03076 [quant-ph], Dec. 20, 2016, 10 pages.

Wallman et al., "Estimating the Coherence of Noise," New J. Phys. 17, arXiv:1503.07865 [quant-ph], 2015, 10 pages.

Wood et al., "Quantification and Characterization of Leakage Errors," Phys. Rev. A 97, arXiv:1704.03081 [quant-ph], 2018, 19 pages.

Zeng et al., "Transversality versus Universality for Additive Quantum Codes," IEEE Transactions on Information Theory, arXiv:0706.1382 [quant-ph], 2011, 12 pages.

C'Orcoles et al., "Process verification of two-qubit q5antum gates by randomized benchmarking," Version 1, Phys. Rev. A 87, arXiv:1210.7011 [quant-ph], Oct. 25, 2012, 9 pages.

* cited by examiner

SYNTHESIS OF A QUANTUM CIRCUIT

BACKGROUND

The subject disclosure relates to quantum circuits, and more specifically, to synthesis of a quantum circuit.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Quantum computing has the potential to solve problems that, due to their computational complexity, cannot be solved, either at all or for all practical purposes, on a classical computer. A challenge in implementing quantum computing is efficient synthesis of certain quantum circuits (e.g., efficient synthesis in terms of computational costs). The size of the Clifford and controlled NOT-Dihedral (CNOT-Dihedral) groups grows exponentially with the number of qubits, so it is difficult to find an efficient synthesis of quantum circuits having such groups. It is also difficult to find an efficient synthesis (e.g., corresponding to relatively low computational costs) of such quantum circuits using a minimal number of physical basic gates (e.g., quantum gates), in particular, 2-qubit gates such as, for instance, the controlled-X (CNOT) gate.

A problem with existing technologies that reduce the number of CNOT gates in a quantum circuit is that they do not reduce the number of CNOT gates in a Clifford quantum circuit having a Clifford group or a CNOT-Dihedral quantum circuit having a CNOT-Dihedral group. Another problem with such existing technologies is that they involve an iterative constructive approach based on the number of qubits in a quantum circuit.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate synthesis of a quantum circuit are described.

According to an embodiment, a system can comprise a memory that stores computer executable components and a processor that executes the computer executable components stored in the memory. The computer executable components can comprise a circuit generation component that generates, iteratively, quantum circuits from 1 to N two-qubit gates, wherein at least one or more iterations (1, 2, ..., N) adds a single two-qubit gate to circuits from a previous iteration based on using added single 2-qubit gates that represent operations distinct from previous operations relative to previous iterations. The computer executable components can further comprise a circuit identification component that identifies, from the quantum circuits, a desired circuit that matches a quantum circuit representation. An advantage of such a system is that it can minimize a number of CNOT gates in the desired circuit.

In some embodiments, the desired circuit comprises a defined number of CNOT gates and a Clifford quantum circuit having a Clifford group or a CNOT-Dihedral quantum circuit having a CNOT-Dihedral group, and the computer executable components further comprise an application component that performs randomized benchmarking on a defined number of qubits in a quantum device based on the desired circuit, thereby facilitating at least one of improved efficiency, improved performance, or reduced computational costs associated with at least one of the application component, the processor, or the system in performing the randomized benchmarking based on the desired circuit. An advantage of such a system is that it can minimize a number of CNOT gates in the desired circuit, thereby facilitating at least one of improved efficiency, improved performance, or reduced computational costs associated with at least one of the application component, the processor, or the system in performing the randomized benchmarking based on the desired circuit.

According to another embodiment, a computer-implemented method can comprise generating, by a system operatively coupled to a processor, iteratively, quantum circuits from 1 to N two-qubit gates, wherein at least one or more iterations (1, 2, ..., N) adds a single two-qubit gate to circuits from a previous iteration based on using added single 2-qubit gates that represent operations distinct from previous operations relative to previous iterations. The computer-implemented method can further comprise identifying, by the system, from the quantum circuits, a desired circuit that matches a quantum circuit representation. An advantage of such a computer-implemented method is that it can be implemented to minimize a number of CNOT gates in the desired circuit.

In some embodiments, the desired circuit comprises a defined number of CNOT gates and a Clifford quantum circuit having a Clifford group or a CNOT-Dihedral quantum circuit having a CNOT-Dihedral group, and the above computer-implemented method can further comprise performing, by the system, randomized benchmarking on a defined number of qubits in a quantum device based on the desired circuit, thereby facilitating at least one of improved efficiency, improved performance, or reduced computational costs associated with at least one of the processor or the system in performing the randomized benchmarking based on the desired circuit. An advantage of such a computer-implemented method is that it can be implemented to minimize a number of CNOT gates in the desired circuit, thereby facilitating at least one of improved efficiency, improved performance, or reduced computational costs associated with at least one of the processor or the system in performing the randomized benchmarking based on the desired circuit.

According to another embodiment, a computer program product facilitating a quantum circuit synthesis process is provided. The computer program product comprising a computer readable storage medium having program instructions embodied therewith, the program instructions executable by a processor to cause the processor to generate, by the processor, iteratively, quantum circuits from 1 to N two-qubit gates, wherein at least one or more iterations (1, 2, ..., N) adds a single two-qubit gate to circuits from a previous iteration based on using added single 2-qubit gates that represent operations distinct from previous operations relative to previous iterations. The program instructions are further executable by the processor to cause the processor to identify, by the processor, from the quantum circuits, a desired circuit that matches a quantum circuit representation. An advantage of such a computer program product is that it can minimize a number of CNOT gates in the desired circuit.

In some embodiments, the desired circuit comprises a defined number of CNOT gates and a Clifford quantum circuit having a Clifford group or a CNOT-Dihedral quantum circuit having a CNOT-Dihedral group, and the program instructions are further executable by the processor to cause the processor to perform, by the processor, randomized benchmarking on a defined number of qubits in a quantum device based on the desired circuit, thereby facilitating at least one of improved efficiency, improved performance, or reduced computational costs associated with the processor in performing the randomized benchmarking based on the desired circuit. An advantage of such a computer program product is that it can minimize a number of CNOT gates in the desired circuit, thereby facilitating at least one of improved efficiency, improved performance, or reduced computational costs associated with the processor in performing the randomized benchmarking based on the desired circuit.

According to an embodiment, a system can comprise a memory that stores computer executable components and a processor that executes the computer executable components stored in the memory. The computer executable components can comprise a circuit generation component that generates, during a first iteration, a first set of quantum circuits comprising 2-qubit gates. The computer executable components can further comprise a second circuit generation component that generates, during a second iteration, a second set of quantum circuits by adding a 2-qubit gate to the first set of quantum circuits such that the second set of quantum circuits are selected to a redundant operation use the 2-qubit gate without introducing the redundant operation to that of the first set of quantum circuits. The computer executable components can further comprise a circuit identification component that identifies, from the first set of quantum circuits and the second set of quantum circuits, a desired circuit that matches a quantum circuit representation. An advantage of such a system is that it can minimize a number of CNOT gates in the desired circuit.

In some embodiments, the desired circuit comprises a defined number of CNOT gates and a Clifford quantum circuit having a Clifford group or a CNOT-Dihedral quantum circuit having a CNOT-Dihedral group, and the computer executable components further comprise an application component that performs randomized benchmarking on a defined number of qubits in a quantum device based on the desired circuit, thereby facilitating at least one of improved efficiency, improved performance, or reduced computational costs associated with at least one of the application component, the processor, or the system in performing the randomized benchmarking based on the desired circuit. An advantage of such a system is that it can minimize a number of CNOT gates in the desired circuit, thereby facilitating at least one of improved efficiency, improved performance, or reduced computational costs associated with at least one of the application component, the processor, or the system in performing the randomized benchmarking based on the desired circuit.

According to another embodiment, a computer-implemented method can comprise generating, by a system operatively coupled to a processor, during a first iteration, a first set of quantum circuits comprising 2-qubit gates. The computer-implemented method can further comprise generating, by the system, during a second iteration, a second set of quantum circuits by adding a 2-qubit gate to the first set of quantum circuits such that the second set of quantum circuits are selected to a redundant operation use the 2-qubit gate without introducing the redundant operation to that of the first set of quantum circuits. The computer-implemented method can further comprise identifying, by the system, from the first set of quantum circuits and the second set of quantum circuits, a desired circuit that matches a quantum circuit representation. An advantage of such a computer-implemented method is that it can be implemented to minimize a number of CNOT gates in the desired circuit.

In some embodiments, the desired circuit comprises a defined number of CNOT gates and a Clifford quantum circuit having a Clifford group or a CNOT-Dihedral quantum circuit having a CNOT-Dihedral group, and the above computer-implemented method can further comprise performing, by the system, randomized benchmarking on a defined number of qubits in a quantum device based on the desired circuit, thereby facilitating at least one of improved efficiency, improved performance, or reduced computational costs associated with at least one of the processor or the system in performing the randomized benchmarking based on the desired circuit. An advantage of such a computer-implemented method is that it can be implemented to minimize a number of CNOT gates in the desired circuit, thereby facilitating at least one of improved efficiency, improved performance, or reduced computational costs associated with at least one of the processor or the system in performing the randomized benchmarking based on the desired circuit.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with prior art technologies, the present disclosure can be implemented to produce a solution to these problems in the form of systems, computer-implemented methods, and/or computer program products that can: generate, iteratively, quantum circuits from 1 to N two-qubit gates, wherein at least one or more iterations (1, 2, . . . , N) adds a single two-qubit gate to circuits from a previous iteration based on using added single 2-qubit gates that represent operations distinct from previous operations relative to previous iterations; and/or identify, from the quantum circuits, a desired circuit that matches a quantum circuit representation. An advantage of such systems, computer-implemented methods, and/or computer program products is that they can be implemented to minimize a number of CNOT gates in the desired circuit.

In some embodiments, the present disclosure can be implemented to produce a solution to the problems described above in the form of systems, computer-implemented methods, and/or computer program products that can perform randomized benchmarking on a defined number of qubits in a quantum device based on the desired circuit, where the desired circuit comprises a defined number of CNOT gates and a Clifford quantum circuit having a Clifford group or a CNOT-Dihedral quantum circuit having a CNOT-Dihedral group, thereby facilitating at least one of improved efficiency, improved performance, or reduced computational costs associated with at least one of a processor or a system in performing the randomized benchmarking based on the desired circuit. An advantage of such systems, computer-implemented methods, and/or computer program products is that they can be implemented to minimize a number of CNOT gates in the desired circuit, thereby facilitating at least one of improved efficiency, improved performance, or reduced computational costs associated with at least one of a processor or a system in performing the randomized benchmarking based on the desired circuit.

Figure 1:
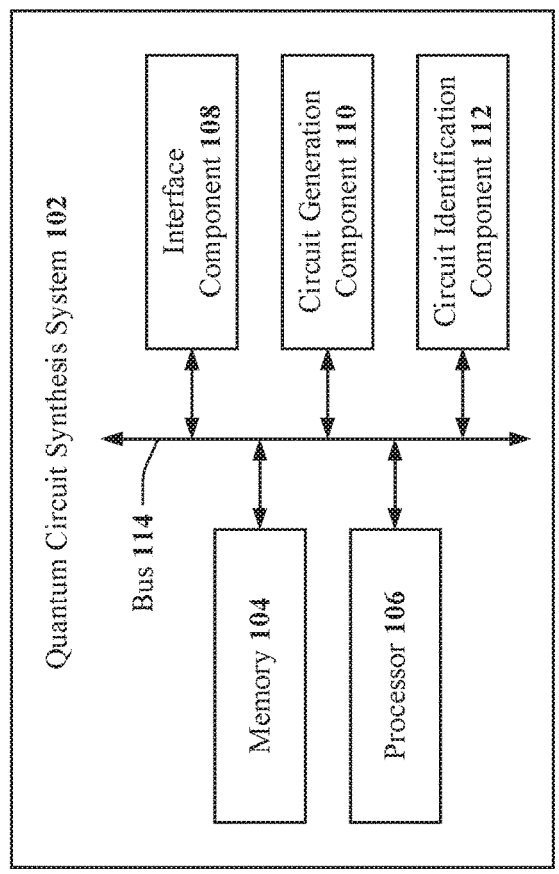
FIGS. 1 and 2 illustrate block diagrams of example, non-limiting systems that can facilitate synthesis of a quantum circuit in accordance with one or more embodiments described herein.
Figure 2:
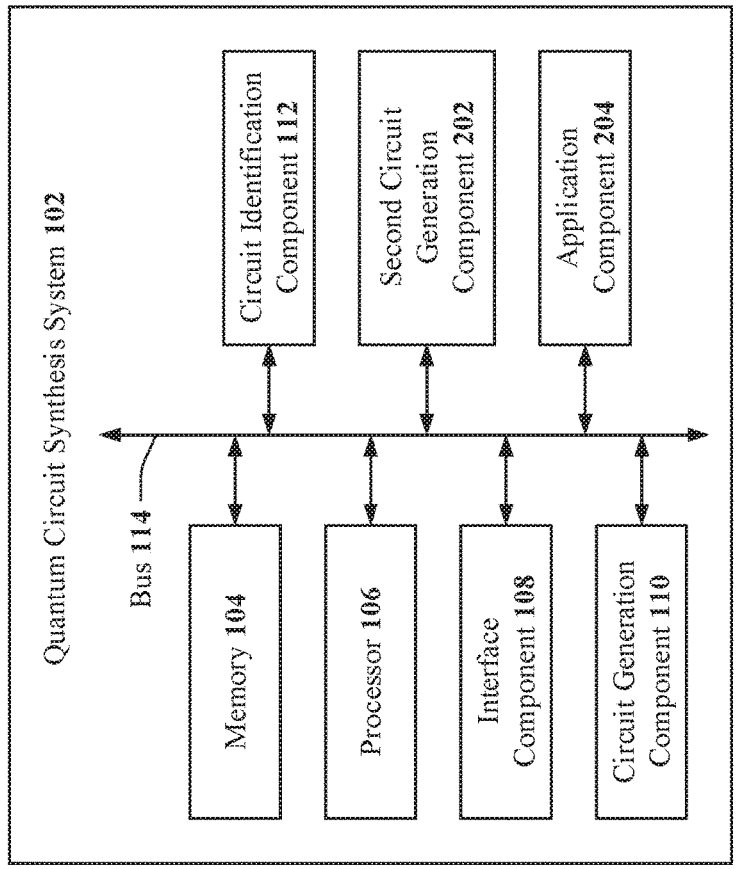

FIGS. 1 and 2 illustrate block diagrams of example, non-limiting systems 100 and 200, respectively, that can facilitate synthesis of a quantum circuit in accordance with one or more embodiments described herein. System 100 and/or system 200 can comprise a quantum circuit synthesis system 102. As illustrated in the example embodiment depicted in FIG. 1, quantum circuit synthesis system 102 of system 100 can comprise a memory 104, a processor 106, an interface component 108, a circuit generation component 110, a circuit identification component 112, and/or a bus 114. As illustrated in the example embodiment depicted in FIG. 2, quantum circuit synthesis system 102 of system 200 can further comprise a second circuit generation component 202 and/or an application component 204.

In some embodiments, quantum circuit synthesis system 102 can be associated with a cloud computing environment. For example, quantum circuit synthesis system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Quantum circuit synthesis system 102 and/or components thereof (e.g., interface component 108, circuit generation component 110, circuit identification component 112, second circuit generation component 202, application component 204, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by quantum circuit synthesis system 102 and/or components thereof to execute one or more operations in accordance with one or more embodiments of the subject disclosure described herein. For instance, quantum circuit synthesis system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with the example embodiments illustrated in FIGS. 1 and 2. It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, and/or quantum circuit synthesis system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum circuit synthesis system 102, interface component 108, circuit generation component 110, circuit identification component 112, second circuit generation component 202, application component 204, and/or another component associated with quantum circuit synthesis system 102 as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Quantum circuit synthesis system 102, memory 104, processor 106, interface component 108, circuit generation component 110, circuit identification component 112, second circuit generation component 202, application component 204, and/or another component of quantum circuit synthesis system 102 as described herein can be communicatively, electrically, operatively, and/or optically coupled to one another via a bus 114 to perform functions of system 100, system 200, quantum circuit synthesis system 102, and/or any components coupled therewith. Bus 114 can comprise one or more memory bus, memory controller, peripheral bus, external bus, local bus, a quantum bus, and/or another type of bus that can employ various bus architectures. Further examples of bus 114 are described below with reference to system bus 818 and FIG. 8. Such examples of bus 114 can be employed to implement any embodiments of the subject disclosure.

Quantum circuit synthesis system 102 can comprise any type of component, machine, device, facility, apparatus, and/or instrument that comprises a processor and/or can be capable of effective and/or operative communication with a wired and/or wireless network. All such embodiments are envisioned. For example, quantum circuit synthesis system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Quantum circuit synthesis system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, quantum circuit synthesis system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, quantum circuit synthesis system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, quantum circuit synthesis system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between quantum circuit synthesis system 102 and external systems, sources, and/or devices (e.g., computing devices, communication devices, etc.).

Quantum circuit synthesis system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with quantum circuit synthesis system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, interface component 108, circuit generation component 110, circuit identification component 112, second circuit generation component 202, application component 204, and/or any other components associated with quantum circuit synthesis system 102 as disclosed herein (e.g., communicatively, electronically, operatively, and/or optically coupled with and/or employed by quantum circuit synthesis system 102), can comprise such computer and/or machine readable, writable, and/or executable component(s) and/or instruction(s). Consequently, according to numerous embodiments, quantum circuit synthesis system 102 and/or any components associated therewith as disclosed herein, can employ processor 106 to execute such computer and/or machine readable, writable, and/or executable component(s) and/or instruction(s) to facilitate performance of one or more operations described herein with reference to quantum circuit synthesis system 102 and/or any such components associated therewith.

Quantum circuit synthesis system 102 can facilitate (e.g., via processor 106) performance of operations executed by and/or associated with one or more components thereof (e.g., interface component 108, circuit generation component 110, circuit identification component 112, second circuit generation component 202, application component 204, etc.). For example, as described in detail below, quantum circuit synthesis system 102 can facilitate (e.g., via processor 106): receiving a quantum circuit representation; generating, iteratively, quantum circuits from 1 to N two-qubit gates, where at least one or more iterations (1, 2, . . . , N) adds a single two-qubit gate to circuits from a previous iteration based on using added single 2-qubit gates that represent operations distinct from previous operations relative to previous iterations; and/or identifying from the quantum circuits, a desired circuit that matches the quantum circuit representation. In this example, as described in detail below, quantum circuit synthesis system 102 can further facilitate (e.g., via processor 106): generating, iteratively, the quantum circuits to minimize a number of CNOT gates in the desired circuit; and/or performing randomized benchmarking on a defined number of qubits in a quantum device based on the desired circuit, where the desired circuit comprises a defined number of CNOT gates and a Clifford quantum circuit having a Clifford group or a CNOT-Dihedral quantum circuit having a CNOT-Dihedral group, thereby facilitating at least one of improved efficiency, improved performance, or reduced computational costs associated with at least one of a processor or a system in performing the randomized benchmarking based on the desired circuit. In this example, the quantum circuits can comprise a Clifford quantum circuit having a Clifford group and/or the quantum circuits can comprise a CNOT-Dihedral quantum circuit having a CNOT-Dihedral group.

In another example, as described in detail below, quantum circuit synthesis system 102 can facilitate (e.g., via processor 106): receiving a quantum circuit representation; generating, during a first iteration, a first set of quantum circuits comprising 2-qubit gates; generating, during a second iteration, a second set of quantum circuits by adding a 2-qubit gate to the first set of quantum circuits such that the second set of quantum circuits are selected to a redundant operation use the added single 2-qubit gate without introducing the redundant operation to that of the first set of quantum circuits; and/or identifying from the first set of quantum circuits and the second set of quantum circuits, a desired circuit that matches the quantum circuit representation. In this example, as described in detail below, quantum circuit synthesis system 102 can further facilitate (e.g., via processor 106): generating, iteratively, the first set of quantum circuits and the second set of quantum circuits to minimize a number of CNOT gates in the desired circuit; and/or performing randomized benchmarking on a defined number of qubits in a quantum device based on the desired circuit, where the desired circuit comprises a defined number of CNOT gates and a Clifford quantum circuit having a Clifford group or a CNOT-Dihedral quantum circuit having a CNOT-Dihedral group, thereby facilitating at least one of improved efficiency, improved performance, or reduced computational costs associated with at least one of a processor or a system in performing the randomized benchmarking based on the desired circuit. In this example, the first set of quantum circuits and the second set of quantum circuits can comprise Clifford quantum circuits having a Clifford group and/or the first set of quantum circuits and the second set of quantum circuits can comprise CNOT-Dihedral quantum circuits having a CNOT-Dihedral group.

To facilitate performance of one or more of such operations described above in accordance with one or more embodiments of the subject disclosure, quantum circuit synthesis system 102 (e.g., via processor 106, interface component 108, circuit generation component 110, circuit identification component 112, second circuit generation component 202, application component 204, etc.) can derive and/or implement the one or more new algorithms and/or the one or more new lemmas described below. As referenced herein, the terms below can be defined as follows.

The n-qubit Clifford group C is the group of quantum circuits generated by the gates H (Hadamard), S (phase), and CX (controlled-X), up to a global phase, where:

H=[[1,1],[1,−1]] is the 1-qubit Hadamard gate (up to a global phase);

S=[[1,0],[0,i]] is the 1-qubit phase gate;

V=SH (or any other equivalent 1-qubit Clifford element of order 3);

CX=[[1,0,0,0],[0,1,0,0],[0,0,0,1],[0,0,1,0]] is the 2-qubit controlled-X gate; and C(r) is the subset of operators in C implementable by a circuit with r CX gates (and any number of 1-qubit gates).

The non-Clifford CNOT-Dihedral group G on n-qubits is generated by the gates X, T=T(m), and CX, up to a global phase, where:

X=[[0,1],[1,0]] is the 1-qubit Pauli-X gate;

Fix an integer m and define the 1-qubit gate T(m)=[[1,0],[0,u(m)]], where $u(m)=e^{2\pi i/m}$ is an m-th root of unity (or any other equivalent 1-qubit CNOT-Dihedral element of order m);

T gate can be denoted as T=T(m), although the T gate is usually defined as T(8); and G(r) is the subset of operators in G implementable by a circuit with r CX gates (and any number of 1-qubit gates).

Algorithm 1: Successive Generation of a Clifford Circuit

C(r) is the subset of operators in the Clifford group C implementable by a circuit with r CX gates.

C(r+1) can be successively constructed from C(r) using Lemma 1 defined below.

Lemma 1:

Based on an assumption that U is any element in C(r+1), then $U=V_i^k V_j^l CX_{i,j} U'$ for some $0 \le i<j<n$, $0 \le k,l \le 2$ and U' in C(r), where U' is a corresponding element in C(r) that satisfies the equality $U=V_i^k V_j^l CX_{i,j} U'$ as defined above.

In particular, $|C(r+1)| \le 9(n^2-n)/2|C(r)|$.

This bound is sharp: if n=2, then |C(1)|=9|C(0)|.

Algorithm 2: Successive Generation of a CNOT-Dihedral Circuit

G(r) is the subset of operators in the CNOT-Dihedral group G implementable by a circuit with r CX gates.

G(r+1) can be successively constructed from G(r) using Lemma 2 defined below.

Lemma 2:

Based on an assumption that U is any element in G(r+1), then $U=I_i T_j^l CX_{i,j} U'$ for some $0 \le i,j<n$, $0 \le l<m/d$, $d=\gcd(m,2)$ and U' in G(r), where U' is a corresponding element in G(r) that satisfies the equality $U=I_i T_j^l CX_{i,j} U'$ as defined above.

In particular, $|G(r+1)| \le m(n^2-n)/d |G(r)|$.

This bound is sharp: if n=2, then |G(1)|=2 m/d|G(0)|.

To facilitate implementation of one or more of the algorithms and/or lemmas defined above, in some embodiments described herein, interface component 108 (e.g., an application programming interface (API), a representational state transfer (REST) API, a graphical user interface (GUI), etc.) can receive a quantum circuit representation 116 (e.g., a mathematical representation, an algebraic representation, etc.). In these embodiments, circuit generation component 110 can implement (e.g., via processor 106) one or more of the algorithms and/or lemmas defined above to generate, iteratively, quantum circuits 118 (also referred to herein as circuits 118) from 1 to N two-qubit gates 120, wherein at least one or more iterations 122 (e.g., 1, 2, . . . , N, where N denotes a total quantity) adds a single two-qubit gate 124 (e.g., controlled-X (CNOT) gate, CNOT gate, etc.) to circuits 118 from a previous iteration 126 based on using added single 2-qubit gates 124 (e.g., controlled-X (CNOT) gates, CNOT gates, etc.) that represent operations 128 distinct from previous operations 142 relative to previous iterations 126. In these embodiments, circuit identification component 112 can implement (e.g., processor 106) one or more of the algorithms and/or lemmas defined above to identify, from quantum circuits 118, a desired circuit 130 that matches quantum circuit representation 116. For example, in these embodiments, circuit identification component 112 can identify, from quantum circuits 118, such a desired circuit 130 that matches quantum circuit representation 116, where desired circuit 130 can comprise a defined number of CNOT gates 132. For instance, in these embodiments, the added single 2-qubit gates 124 described above can comprise CNOT gates 132 that represent operations 128 distinct from previous operations 142 (e.g., operations 128 and previous operations 142 are not redundant operations), and as such, desired circuit 130 can comprise the least number (e.g., smallest number) of CNOT gates 132 (e.g., the least number of CNOT gates 132 relative to the number of CNOT gates 132 in other successively generated quantum circuits 118).

In some embodiments, quantum circuits 118 described above can comprise a Clifford quantum circuit 134 having a Clifford group 136. In these embodiments, circuit generation component 110 can implement (e.g., via processor 106) algorithm 1 and/or lemma 1 defined above to successively generate the Clifford quantum circuits 134 having a Clifford group 136. In these embodiments, circuit identification component 112 can implement (e.g., via processor 106)

algorithm 1 and/or lemma 1 defined above to identify, from the quantum circuits 118 (e.g., from the generated Clifford quantum circuits 134 having a Clifford group 136), a desired circuit 130 that matches the quantum circuit representation 116. In these embodiments, such a desired circuit 130 can comprise a Clifford quantum circuit 134 having a Clifford group 136 and a defined number of CNOT gates 132. For instance, in these embodiments, the desired circuit 130 can comprise a Clifford quantum circuit 134 having a Clifford group 136 and the least number (e.g., smallest number) of CNOT gates 132 (e.g., the least number of CNOT gates 132 relative to the number of CNOT gates 132 in other successively generated Clifford quantum circuits 134). Consequently, in these embodiments, it should be appreciated that circuit generation component 110 can implement (e.g., via processor 106) algorithm 1 and/or lemma 1 defined above to generate, iteratively, the quantum circuits 118 (e.g., Clifford quantum circuits 134 having a Clifford group 136) to minimize a number of CNOT gates 132 in the desired circuit 130. For instance, in these embodiments, circuit generation component 110 can implement (e.g., via processor 106) algorithm 1 and/or lemma 1 defined above to successively generate a Clifford quantum circuit 134 having a Clifford group 136 and a defined number of CNOT gates 132 (e.g., the least number of CNOT gates 132 relative to the number of CNOT gates 132 in other successively generated Clifford quantum circuits 134).

In some embodiments, quantum circuits 118 described above can comprise a CNOT-Dihedral quantum circuit 138 having a CNOT-Dihedral group 140. In these embodiments, circuit generation component 110 can implement (e.g., via processor 106) algorithm 2 and/or lemma 2 defined above to successively generate the CNOT-Dihedral quantum circuit 138 having a CNOT-Dihedral group 140. In these embodiments, circuit identification component 112 can implement (e.g., via processor 106) algorithm 2 and/or lemma 2 defined above to identify, from the quantum circuits 118 (e.g., from the generated CNOT-Dihedral quantum circuits 138 having a CNOT-Dihedral group 140), a desired circuit 130 that matches the quantum circuit representation 116. In these embodiments, such a desired circuit 130 can comprise a CNOT-Dihedral quantum circuit 138 having a CNOT-Dihedral group 140 and a defined number of CNOT gates 132. For instance, in these embodiments, the desired circuit 130 can comprise a CNOT-Dihedral quantum circuit 138 having a CNOT-Dihedral group 140 and the least number (e.g., smallest number) of CNOT gates 132 (e.g., the least number of CNOT gates 132 relative to the number of CNOT gates 132 in other successively generated CNOT-Dihedral quantum circuits 138). Consequently, in these embodiments, it should be appreciated that circuit generation component 110 can implement (e.g., via processor 106) algorithm 2 and/or lemma 2 defined above to generate, iteratively, the quantum circuits 118 (e.g., CNOT-Dihedral quantum circuits 138 having a CNOT-Dihedral group 140) to minimize a number of CNOT gates 132 in the desired circuit 130. For instance, in these embodiments, circuit generation component 110 can implement (e.g., via processor 106) algorithm 2 and/or lemma 2 defined above to successively generate a CNOT-Dihedral quantum circuit 138 having a CNOT-Dihedral group 140 and a defined number of CNOT gates 132 (e.g., the least number of CNOT gates 132 relative to the number of CNOT gates 132 in other successively generated CNOT-Dihedral quantum circuits 138).

Turning now to the example embodiment illustrated in FIG. 2. Quantum circuit synthesis system 102 of system 200 depicted in FIG. 2 can comprise an example, non-limiting alternative embodiment of quantum circuit synthesis system 102 of system 100 described above and depicted in FIG. 1, where quantum circuit synthesis system 102 of system 200 can further comprise a second circuit generation component 202 and/or an application component 204.

In some embodiments, based on interface component 108 (e.g., an API, a REST API, a GUI, etc.) receiving a quantum circuit representation 116, circuit generation component 110 can implement (e.g., via processor 106) one or more of the algorithms and/or lemmas described above to generate, during a first iteration 206, a first set of quantum circuits 208 comprising 2-qubit gates 120. In these embodiments, second circuit generation component 202 can implement (e.g., via processor 106) one or more of the algorithms and/or lemmas described above to generate, during a second iteration 210, a second set of quantum circuits 212 by adding a 2-qubit gate 124 to the first set of quantum circuits 208 such that the second set of quantum circuits 212 are selected to a redundant operation 226 use the 2-qubit gate 124 without introducing redundant operation 226 to that of the first set of quantum circuits 208. In these embodiments, circuit identification component 112 can implement (e.g., via processor 106) one or more of the algorithms and/or lemmas described above to identify, from the first set of quantum circuits 208 and the second set of quantum circuits 212, a desired circuit 130 that matches the quantum circuit representation 116. For example, in these embodiments, circuit identification component 112 can identify, from the first set of quantum circuits 208 and the second set of quantum circuits 212, such a desired circuit 130 that matches the quantum circuit representation 116, where the desired circuit 130 can comprise a defined number of CNOT gates 132. For instance, in these embodiments, the added 2-qubit gate 124 described above can comprise CNOT gates 132 that represent operations 128 distinct from previous operations 142 (e.g., not redundant operations), and as such, the desired circuit 130 can comprise the least number (e.g., smallest number) of CNOT gates 132 (e.g., the least number of CNOT gates 132 relative to the number of CNOT gates 132 in other successively generated quantum circuits 118 in the first set of quantum circuits 208 and/or the second set of quantum circuits 212).

In some embodiments, the first set of quantum circuits 208 and the second set of quantum circuits 212 described above can respectively comprise a first set of Clifford quantum circuits 214 having a Clifford group 136 and a second set of Clifford quantum circuits 216 having a Clifford group 136, where the first set of Clifford quantum circuits 214 and the second set of Clifford quantum circuits 216 can respectively comprise Clifford quantum circuits 134 having a Clifford group 136. In these embodiments, circuit generation component 110 and second circuit generation component 202 can implement (e.g., via processor 106) algorithm 1 and/or lemma 1 defined above to successively generate the first set of Clifford quantum circuits 214 having a Clifford group 136 and the second set of Clifford quantum circuits 216 having a Clifford group 136. In these embodiments, circuit identification component 112 can implement (e.g., via processor 106) algorithm 1 and/or lemma 1 defined above to identify, from the first set of quantum circuits 208 and the second set of quantum circuits 212 (e.g., from the first set of Clifford quantum circuits 214 having a Clifford group 136 and the second set of Clifford quantum circuits 216 having a Clifford group 136), a desired circuit 130 that matches the quantum circuit representation 116. In these embodiments, such a desired circuit 130 can comprise a Clifford quantum circuit 134 having a Clifford group 136 and a defined number of CNOT gates 132. For instance, in these embodiments, the desired circuit 130 can comprise a Clifford quantum circuit 134 having a Clifford group 136 and the least number (e.g., smallest number) of CNOT gates 132 (e.g., the least number of CNOT gates 132 relative to the number of CNOT gates 132 in other successively generated Clifford quantum circuits 134 in the first set of Clifford quantum circuits 214 and the second set of Clifford quantum circuits 216). Consequently, in these embodiments, it should be appreciated that circuit generation component 110 can implement (e.g., via processor 106) algorithm 1 and/or lemma 1 defined above to generate, iteratively, the first set of quantum circuits 208 and the second set of quantum circuits 212 (e.g., the first set of Clifford quantum circuits 214 having a Clifford group 136 and the second set of Clifford quantum circuits 216 having a Clifford group 136) to minimize a number of CNOT gates 132 in the desired circuit 130. For instance, in these embodiments, circuit generation component 110 can implement (e.g., via processor 106) algorithm 1 and/or lemma 1 defined above to successively generate a Clifford quantum circuit 134 having a Clifford group 136 and a defined number of CNOT gates 132 (e.g., the least number of CNOT gates 132 relative to the number of CNOT gates 132 in other successively generated Clifford quantum circuits 134 in the first set of Clifford quantum circuits 214 and the second set of Clifford quantum circuits 216).

In some embodiments, the first set of quantum circuits 208 and the second set of quantum circuits 212 described above can respectively comprise a first set of CNOT-Dihedral quantum circuits 218 having a CNOT-Dihedral group 140 and a second set of CNOT-Dihedral quantum circuits 220 having a CNOT-Dihedral group 140, where the first set of CNOT-Dihedral quantum circuits 218 and the second set of CNOT-Dihedral quantum circuits 220 can respectively comprise CNOT-Dihedral quantum circuits 138 having a CNOT-Dihedral group 140. In these embodiments, circuit generation component 110 and second circuit generation component 202 can implement (e.g., via processor 106) algorithm 2 and/or lemma 2 defined above to successively generate the first set of CNOT-Dihedral quantum circuits 218 having a CNOT-Dihedral group 140 and the second set of CNOT-Dihedral quantum circuits 220 having a CNOT-Dihedral group 140. In these embodiments, circuit identification component 112 can implement (e.g., via processor 106) algorithm 2 and/or lemma 2 defined above to identify, from the first set of quantum circuits 208 and the second set of quantum circuits 212 (e.g., from the first set of CNOT-Dihedral quantum circuits 218 having a CNOT-Dihedral group 140 and the second set of CNOT-Dihedral quantum circuits 220 having a CNOT-Dihedral group 140), a desired circuit 130 that matches the quantum circuit representation 116. In these embodiments, such a desired circuit 130 can comprise a CNOT-Dihedral quantum circuit 138 having a CNOT-Dihedral group 140 and a defined number of CNOT gates. For instance, in these embodiments, the desired circuit 130 can comprise a CNOT-Dihedral quantum circuit 138 having a CNOT-Dihedral group 140 and the least number (e.g., smallest number) of CNOT gates 132 (e.g., the least number of CNOT gates 132 relative to the number of CNOT gates 132 in other successively generated CNOT-Dihedral quantum circuits 138 in the first set of CNOT-Dihedral quantum circuits 218 and the second set of CNOT-Dihedral quantum circuits 220). Consequently, in these embodiments, it should be appreciated that circuit generation component 110 can implement (e.g., via processor 106) algorithm 2 and/or lemma 2 defined above to generate, iteratively, the first set of quantum circuits 208 and the second set of quantum circuits 212 (e.g., the first set of CNOT-Dihedral quantum circuits 218 having a CNOT-Dihedral group 140 and the second set of CNOT-Dihedral quantum circuits 220 having a CNOT-Dihedral group 140) to minimize a number of CNOT gates 132 in the desired circuit 130. For instance, in these embodiments, circuit generation component 110 can implement (e.g., via processor 106) algorithm 2 and/or lemma 2 defined above to successively generate a CNOT-Dihedral quantum circuit 138 having a CNOT-Dihedral group 140 and a defined number of CNOT gates 132 (e.g., the least number of CNOT gates 132 relative to the number of CNOT gates 132 in other successively generated CNOT-Dihedral quantum circuits 138 in the first set of CNOT-Dihedral quantum circuits 218 and the second set of CNOT-Dihedral quantum circuits 220).

Continuing now with the example embodiment illustrated in FIG. 2. Application component 204 can perform randomized benchmarking on a defined number of qubits 222 in a quantum device 224 based on (e.g., using) the desired circuit 130 described above that can be identified by circuit identification component 112. In an example embodiment, application component 204 can comprise a classical computer (e.g., computer 812, etc.) that can execute (e.g., via processor 106, processing unit 814, etc.) a randomized benchmarking algorithm to perform randomized benchmarking on a limited number of qubits 222 (e.g., more than 2 qubits, for instance, 3 qubits, 4 qubits, 5 qubits, etc.) in a quantum device 224 (e.g., a quantum processor, a quantum circuit, a superconducting circuit, etc.) based on (e.g., using) the desired circuit 130 described above. In this example embodiment, such a random benchmarking algorithm can comprise an algorithm that provides an efficient and reliable experimental estimation of an average error-rate for a set of quantum gate operations by running sequences of random gates from the Clifford group 136 or CNOT-Dihedral group 140 that should return the qubits 222 in the quantum device 224 to the initial state. In this example embodiment, by performing randomized benchmarking using the desired circuit 130 described above (e.g., a Clifford quantum circuit 134 having a Clifford group 136 or a CNOT-Dihedral quantum circuit 138 having a CNOT-Dihedral group 140) that can comprise the least number of CNOT gates 132 relative to other successively generated quantum circuits 118, quantum circuit synthesis system 102 and/or components thereof (e.g., circuit generation component 110, circuit identification component 112, second circuit generation component 202, application component 204, etc.) can thereby facilitate improved efficiency, improved performance, and/or reduced computational costs associated with application component 204, processor 106, system 200, and/or quantum circuit synthesis system 102 in performing the randomized benchmarking based on (e.g., using) the desired circuit 130.

Quantum circuit synthesis system 102 can be associated with various technologies. For example, quantum circuit synthesis system 102 can be associated with quantum computing technologies, quantum circuit technologies, quantum circuit synthesis technologies, quantum algorithm technologies, quantum computing simulation technologies, quantum hardware and/or software technologies, quantum hardware and/or software calibration technologies, machine learning technologies, artificial intelligence technologies, cloud computing technologies, and/or other technologies.

Quantum circuit synthesis system 102 can provide technical improvements to systems, devices, components, operational steps, and/or processing steps associated with the various technologies identified above. For example, quantum circuit synthesis system 102 can: receive a quantum circuit representation 116; generate, iteratively, quantum circuits 118 (also referred to herein as circuits 118) from 1 to N two-qubit gates 120, wherein at least one or more iterations 122 (e.g., 1, 2, . . . , N, where N denotes a total quantity) adds a single two-qubit gate 124 to circuits 118 from a previous iteration 126 based on using added single 2-qubit gates 124 that represent operations 128 distinct from previous operations 142 relative to previous iterations 126; and/or identify, from the quantum circuits 118, a desired circuit 130 that matches the quantum circuit representation 116. An advantage of quantum circuit synthesis system 102 is that it can minimize the number of CNOT gates 132 in the desired circuit 130, which can comprise a Clifford quantum circuit 134 having a Clifford group 136 and/or a CNOT-Dihedral quantum circuit 138 having a CNOT-Dihedral group 140.

In the example above, by successively generating quantum circuits 118 such that desired circuit 130 has a minimal number of CNOT gates 132 as described herein, quantum circuit synthesis system 102 can thereby facilitate improved application of such desired circuit 130, as it can be efficiently generated, manipulated, and/or implemented using a classical computer to perform a variety of tasks. In this example, as quantum circuits 118 and desired circuit 130 can comprise Clifford quantum circuit(s) 134 having a Clifford group 136 and/or CNOT-Dihedral quantum circuit(s) 138 having a CNOT-Dihedral group, it should be appreciated that quantum circuit synthesis system 102 can thereby facilitate improved application of such Clifford quantum circuit(s) 134 and/or CNOT-Dihedral quantum circuit(s) 138, as they can be efficiently generated, manipulated, and/or implemented using a classical computer to perform a variety of tasks. For instance, by successively generating the Clifford quantum circuit 134 and/or the CNOT-Dihedral quantum circuit 138 described above such that they have a minimal number of CNOT gates 132, quantum circuit synthesis system 102 can thereby enable use of such quantum circuits to efficiently: construct quantum error correction codes called stabilizer codes; optimize universal sets of gates (e.g., Clifford+T and/or Clifford+CS (controlled-S)) and simulation (e.g., using the Gottesman-Knill Theorem for the Clifford group 136); and/or benchmark a quantum device 224 using a random benchmarking algorithm (e.g., as described above with reference to FIG. 2).

In another example, by facilitating efficient generation, manipulation, and/or implementation of the Clifford quantum circuit 134 and/or the CNOT-Dihedral quantum circuit 138 described above that have a minimal number of CNOT gates 132, quantum circuit synthesis system 102 can thereby reduce the workload of a component, a processor, and/or a system used to generate, manipulate, and/or implement such quantum circuits. In this example, by reducing the workload of such a component, processor, and/or system used to generate, manipulate, and/or implement the Clifford quantum circuit 134 and/or the CNOT-Dihedral quantum circuit 138 described above, quantum circuit synthesis system 102 can thereby facilitate improved efficiency, improved performance, and/or reduced computational costs associated with such a component (e.g., application component 204), processor (e.g., processor 106, processing unit 814, etc.), and/or a system (e.g., system 100, system 200, operating environment 800, computer 812, etc.) used to generate, manipulate, and/or implement such quantum circuits.

Quantum circuit synthesis system 102 can provide technical improvements to a processing unit (e.g., processor 106, processing unit 814, a quantum processor, etc.) associated with a classical computing device and/or a quantum computing device (e.g., a quantum processor, quantum hardware, superconducting circuit, etc.) associated with quantum circuit synthesis system 102. For example, as described above, by successively generating a Clifford quantum circuit 134 having a Clifford group 136 and/or a CNOT-Dihedral quantum circuit 138 having a CNOT-Dihedral group 140 such that they have a minimal number of CNOT gates 132 as described herein, quantum circuit synthesis system 102 can thereby facilitate efficient generation, manipulation, and/or implementation of such quantum circuits using a classical computer to perform a variety of tasks. In this example, by facilitating efficient generation, manipulation, and/or implementation of the Clifford quantum circuit 134 and/or the CNOT-Dihedral quantum circuit 138 described above that have a minimal number of CNOT gates 132, quantum circuit synthesis system 102 can thereby reduce the workload of a processor (e.g., processor 106, processing unit 814, etc.) used to generate, manipulate, and/or implement such quantum circuits described above.

In the example above, by reducing the workload of such a processor (e.g., processor 106, processing unit 814, etc.) used to generate, manipulate, and/or implement the Clifford quantum circuit 134 and/or the CNOT-Dihedral quantum circuit 138 described above, quantum circuit synthesis system 102 can thereby facilitate improved efficiency, improved performance, and/or reduced computational costs associated with such a processor in performing such operation(s). For instance, quantum circuit synthesis system 102 can enable improved efficiency, improved performance, and/or reduced computational costs associated with processor 106 that can be employed by quantum circuit synthesis system 102 and/or components thereof to successively generate the Clifford quantum circuit 134 and/or the CNOT-Dihedral quantum circuit 138 described above in accordance with one or more embodiments of the subject disclosure described herein. In another example, quantum circuit synthesis system 102 can enable improved efficiency, improved performance, and/or reduced computational costs associated with a processing unit (e.g., processor 106) that can be employed by application component 204 to perform random benchmarking on a quantum device 224 as described above with reference to FIG. 2.

Based on such successive generation of the Clifford quantum circuit 134 and/or the CNOT-Dihedral quantum circuit 138 described above that have a minimal number of CNOT gates 132, a practical application of quantum circuit synthesis system 102 is that it can be used to generate and implement one or both of such quantum circuits to benchmark a quantum device 224 that can then be used to compute one or more solutions (e.g., heuristic(s), etc.) to a variety of problems ranging in complexity (e.g., an estimation problem, an optimization problem, etc.) in a variety of domains (e.g., finance, chemistry, medicine, etc.). For example, a practical application of quantum circuit synthesis system 102 is that it can be deployed using a classical computer (e.g., computer 812) to generate and implement one or both of the Clifford quantum circuit 134 and/or the CNOT-Dihedral quantum circuit 138 to benchmark a quantum device 224 that can then be used to compute a solution (e.g., a heuristic) to an optimization problem and/or an estimation problem in the domain of chemistry, medicine, and/or finance, where such a solution can be used to engineer, for instance, a new chemical compound, a new medication, and/or a new options pricing system and/or method.

It should be appreciated that quantum circuit synthesis system 102 provides a new approach driven by relatively new quantum computing technologies. For example, quantum circuit synthesis system 102 provides a new approach to efficiently generate a Clifford quantum circuit 134 having a Clifford group 136 and/or a CNOT-Dihedral quantum circuit 138 having a CNOT-Dihedral group 140, where such quantum circuits have a minimal number of CNOT gates 132, thereby improving the synthesis and/or application of such quantum circuits. In this example, such a new approach that improves the synthesis and/or application of the Clifford quantum circuit 134 and/or the CNOT-Dihedral quantum circuit 138 can enable faster and more efficient benchmarking of a quantum device 224 that can then be used to compute a solution to such an optimization and/or estimation problem as described above.

Quantum circuit synthesis system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Quantum circuit synthesis system 102 and/or components thereof, can be employed to solve new problems that arise through advancements in technologies mentioned above, employment of quantum computing systems, cloud computing systems, computer architecture, and/or another technology.

It is to be appreciated that quantum circuit synthesis system 102 can utilize various combinations of electrical components, mechanical components, and circuitry that cannot be replicated in the mind of a human or performed by a human, as the various operations that can be executed by quantum circuit synthesis system 102 and/or components thereof as described herein are operations that are greater than the capability of a human mind. For instance, the amount of data processed, the speed of processing such data, or the types of data processed by quantum circuit synthesis system 102 over a certain period of time can be greater, faster, or different than the amount, speed, or data type that can be processed by a human mind over the same period of time.

According to several embodiments, quantum circuit synthesis system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that quantum circuit synthesis system 102 can include information that is impossible to obtain manually by an entity, such as a human user. For example, the type, amount, and/or variety of information included in quantum circuit synthesis system 102, interface component 108, circuit generation component 110, circuit identification component 112, second circuit generation component 202, and/or application component 204 can be more complex than information obtained manually by a human user.

Figure 3:
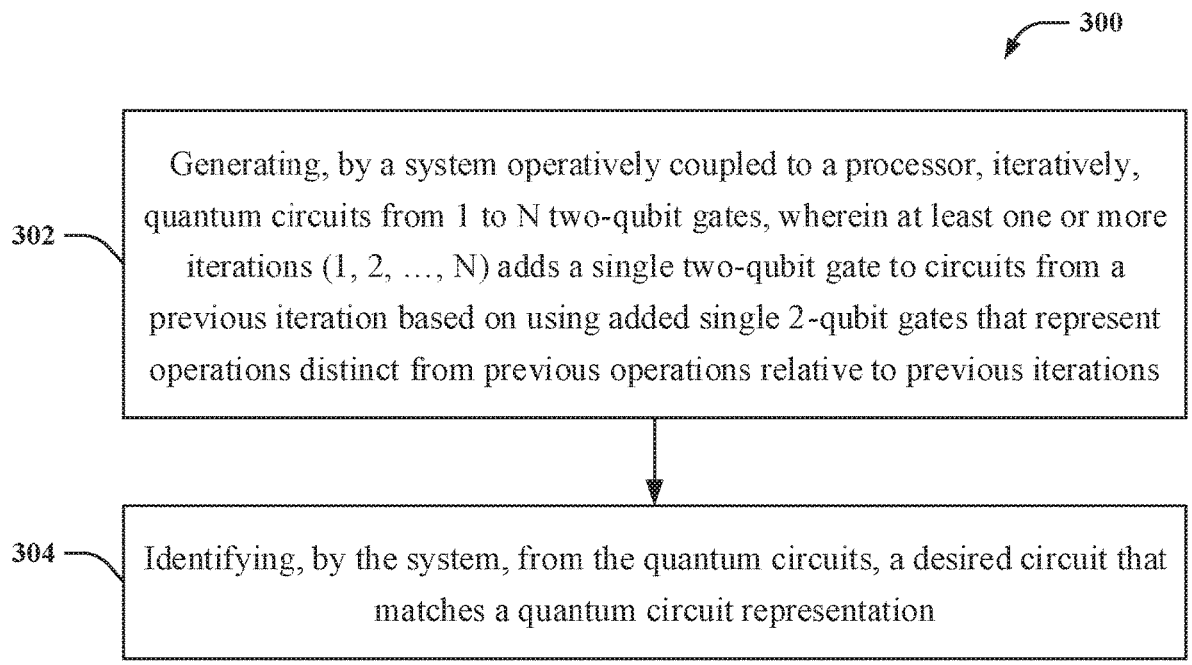
FIGS. 3, 4, 5, 6, and 7 illustrate flow diagrams of example, non-limiting computer-implemented methods that can facilitate synthesis of a quantum circuit in accordance with one or more embodiments described herein.

FIG. 3 illustrates a flow diagram of an example, non-limiting computer-implemented method 300 that can facilitate synthesis of a quantum circuit in accordance with one or more embodiments described herein. Repetitive description of like elements and/or processes employed in respective embodiments is omitted for sake of brevity.

At 302, computer-implemented method 300 can comprise generating, by a system (e.g., via quantum circuit synthesis system 102 and/or circuit generation component 110) operatively coupled to a processor (e.g., processor 106), iteratively, quantum circuits (e.g., quantum circuits 118 comprising Clifford quantum circuits 134 having a Clifford group 136 and/or CNOT-Dihedral quantum circuits 138 having a CNOT-Dihedral group 140) from 1 to N two-qubit gates (e.g., two-qubit gates 120), where at least one or more iterations (1, 2, . . . , N)(e.g., at least one or more iterations 122) adds a single two-qubit gate (e.g., single two-qubit gate 124) to circuits (e.g., quantum circuits 118) from a previous iteration (e.g., previous iteration 126) based on using added single 2-qubit gates (e.g., added single 2-qubit gates 124) that represent operations (e.g., operations 128) distinct from previous operations (e.g., previous operations 142) relative to previous iterations (e.g., previous iterations 126).

At 304, computer-implemented method 300 can comprise identifying, by the system (e.g., via quantum circuit synthesis system 102 and/or circuit identification component 112), from the quantum circuits, a desired circuit (e.g., desired circuit 130 comprising a Clifford quantum circuit 134 having a Clifford group 136 and a minimal number of CNOT gates 132 or a CNOT-Dihedral quantum circuit 138 having a CNOT-Dihedral group 140 and a minimal number of CNOT gates 132) that matches a quantum circuit representation (e.g., quantum circuit representation 116).

Figure 4:
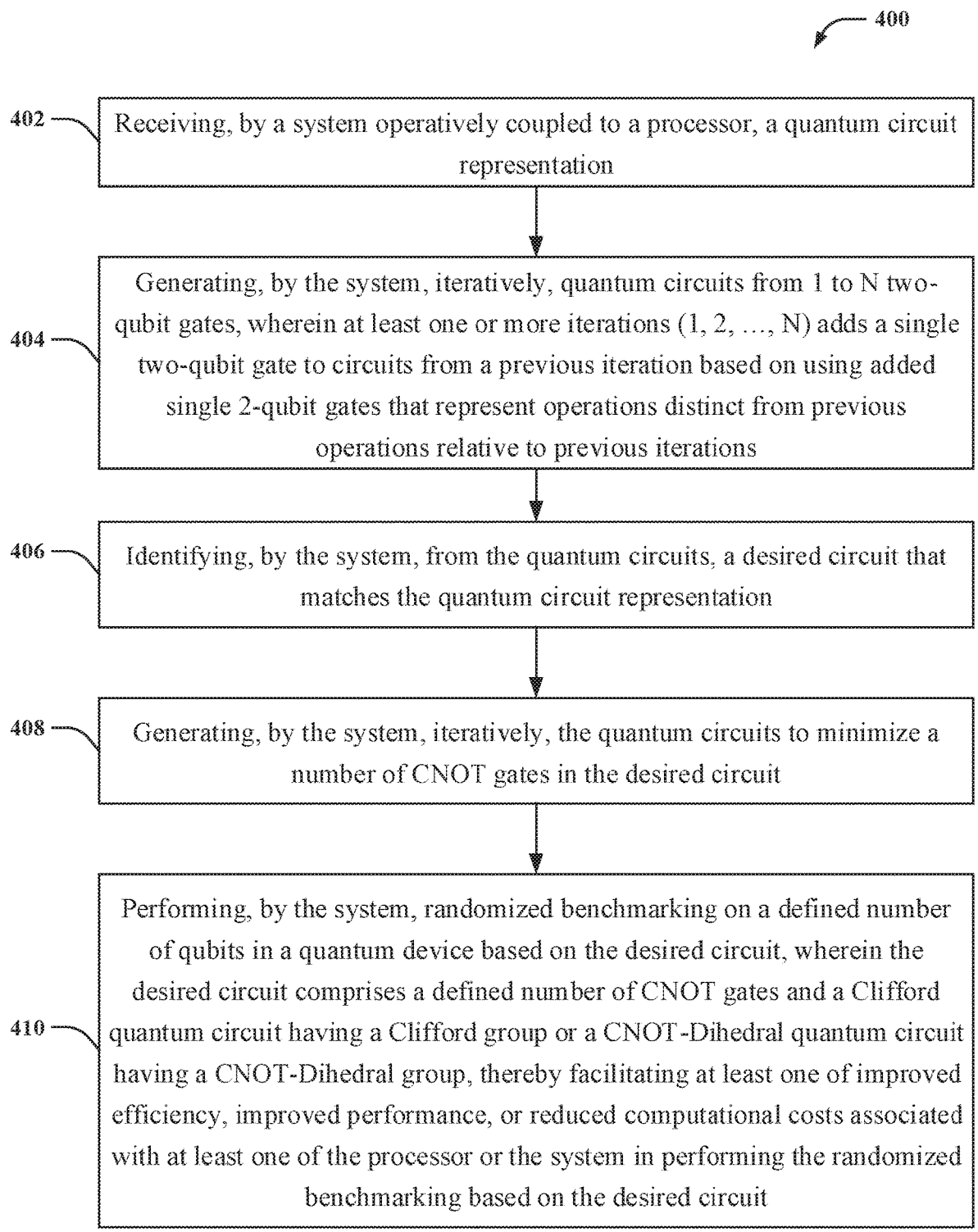

FIG. 4 illustrates a flow diagram of an example, non-limiting computer-implemented method 300 that can facilitate synthesis of a quantum circuit in accordance with one or more embodiments described herein. Repetitive description of like elements and/or processes employed in respective embodiments is omitted for sake of brevity.

At 402, computer-implemented method 400 can comprise receiving, by a system (e.g., via quantum circuit synthesis system 102 and/or interface component 108) operatively coupled to a processor (e.g., processor 106, a quantum processor, etc.), a quantum circuit representation (e.g., quantum circuit representation 116).

At 404, computer-implemented method 400 can comprise generating, by the system (e.g., via quantum circuit synthesis system 102 and/or circuit generation component 110), iteratively, quantum circuits (e.g., quantum circuits 118 comprising Clifford quantum circuits 134 having a Clifford group 136 and/or CNOT-Dihedral quantum circuits 138 having a CNOT-Dihedral group 140) from 1 to N two-qubit gates (e.g., two-qubit gates 120), wherein at least one or more iterations (1, 2, . . . , N)(e.g., at least one or more iterations 122) adds a single two-qubit gate (e.g., single two-qubit gate 124) to circuits (e.g., quantum circuits 118) from a previous iteration (e.g., previous iteration 126) based on using added single 2-qubit gates (e.g., added single 2-qubit gates 124) that represent operations (e.g., operations 128) distinct from previous operations (e.g., previous operations 142) relative to previous iterations (e.g., previous iterations 126).

At 406, computer-implemented method 400 can comprise identifying, by the system (e.g., via quantum circuit synthesis system 102 and/or circuit identification component 112), from the quantum circuits, a desired circuit (e.g., desired circuit 130 comprising a Clifford quantum circuit 134 having a Clifford group 136 and a minimal number of CNOT gates 132 or a CNOT-Dihedral quantum circuit 138 having a CNOT-Dihedral group 140 and a minimal number of CNOT gates 132) that matches the quantum circuit representation.

At 408, computer-implemented method 400 can comprise generating, by the system (e.g., via quantum circuit synthesis system 102 and/or circuit generation component 110), iteratively, the quantum circuits to minimize a number of CNOT gates (e.g., CNOT gates 132) in the desired circuit.

At 410, computer-implemented method 400 can comprise performing, by the system (e.g., via quantum circuit synthesis system 102 and/or application component 204), randomized benchmarking (e.g., via employing a randomized benchmarking algorithm as described above with reference to FIG. 2) on a defined number of qubits (e.g., qubits 222 comprising more than 2 qubits, for instance, 3 qubits, 4 qubits, 5 qubits, etc.) in a quantum device (e.g., quantum device 224) based on (e.g., using) the desired circuit, wherein the desired circuit comprises a defined number of CNOT gates (e.g., CNOT gates 132) and a Clifford quantum circuit having a Clifford group or a CNOT-Dihedral quantum circuit having a CNOT-Dihedral group (e.g., a Clifford quantum circuit 134 having a Clifford group 136 or a CNOT-Dihedral quantum circuit 138 having a CNOT-Dihedral group 140), thereby facilitating at least one of improved efficiency, improved performance, or reduced computational costs associated with at least one of the processor (e.g., processor 106) or the system (e.g., system 100, quantum circuit synthesis system 102, operating environment 800, computer 812, etc.) in performing the randomized benchmarking based on the desired circuit 130.

Figure 5:
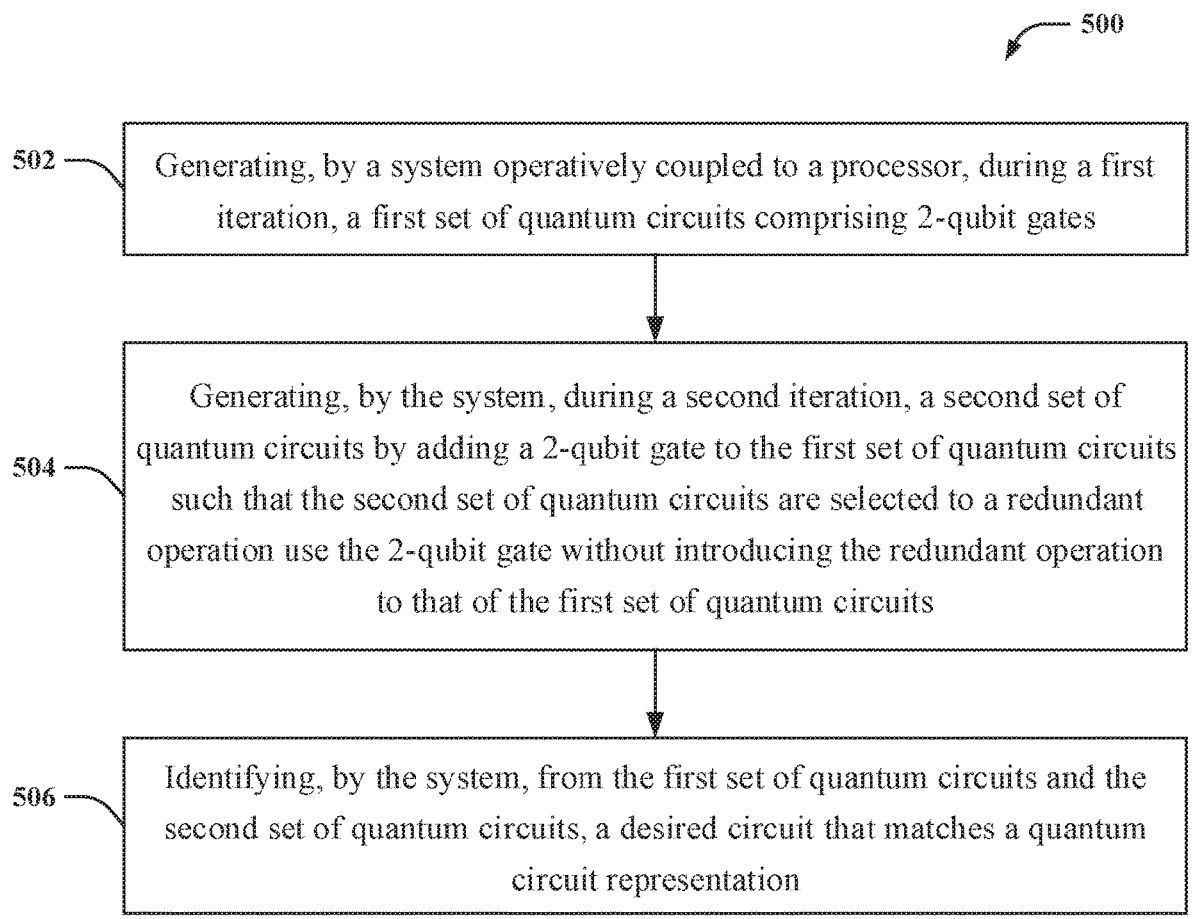

FIG. 5 illustrates a flow diagram of an example, non-limiting computer-implemented method 500 that can facilitate synthesis of a quantum circuit in accordance with one or more embodiments described herein. Repetitive description of like elements and/or processes employed in respective embodiments is omitted for sake of brevity.

At 502, computer-implemented method 500 can comprise generating, by a system (e.g., via quantum circuit synthesis system 102 and/or circuit generation component 110) operatively coupled to a processor (e.g., processor 106), during a first iteration (e.g., first iteration 206), a first set of quantum circuits (e.g., first set of quantum circuits 208 comprising a first set of Clifford quantum circuits 214 having a Clifford group 136 and/or a first set of CNOT-Dihedral quantum circuits 218 having a CNOT-Dihedral group 140) comprising 2-qubit gates (e.g., two-qubit gates 124).

At 504, computer-implemented method 500 can comprise generating, by the system (e.g., via quantum circuit synthesis system 102 and/or second circuit generation component 202), during a second iteration (e.g., second iteration 210), a second set of quantum circuits (e.g., second set of quantum circuits 212 comprising a second set of Clifford quantum circuits 216 having a Clifford group 136 and/or a second set of CNOT-Dihedral quantum circuits 220 having a CNOT-Dihedral group 140) by adding a 2-qubit gate (e.g., single 2-qubit gate 124) to the first set of quantum circuits such that the second set of quantum circuits are selected to a redundant operation (e.g., redundant operation 226) use the 2-qubit gate without introducing the redundant operation to that of the first set of quantum circuits.

At 506, computer-implemented method 500 can comprise identifying, by the system (e.g., via quantum circuit synthesis system 102 and/or circuit identification component 112), from the first set of quantum circuits and the second set of quantum circuits, a desired circuit (e.g., desired circuit 130 comprising a Clifford quantum circuit 134 having a Clifford group 136 and a minimal number of CNOT gates 132 or a CNOT-Dihedral quantum circuit 138 having a CNOT-Dihedral group 140 and a minimal number of CNOT gates 132) that matches a quantum circuit representation (e.g., quantum circuit representation 116).

Figure 6:
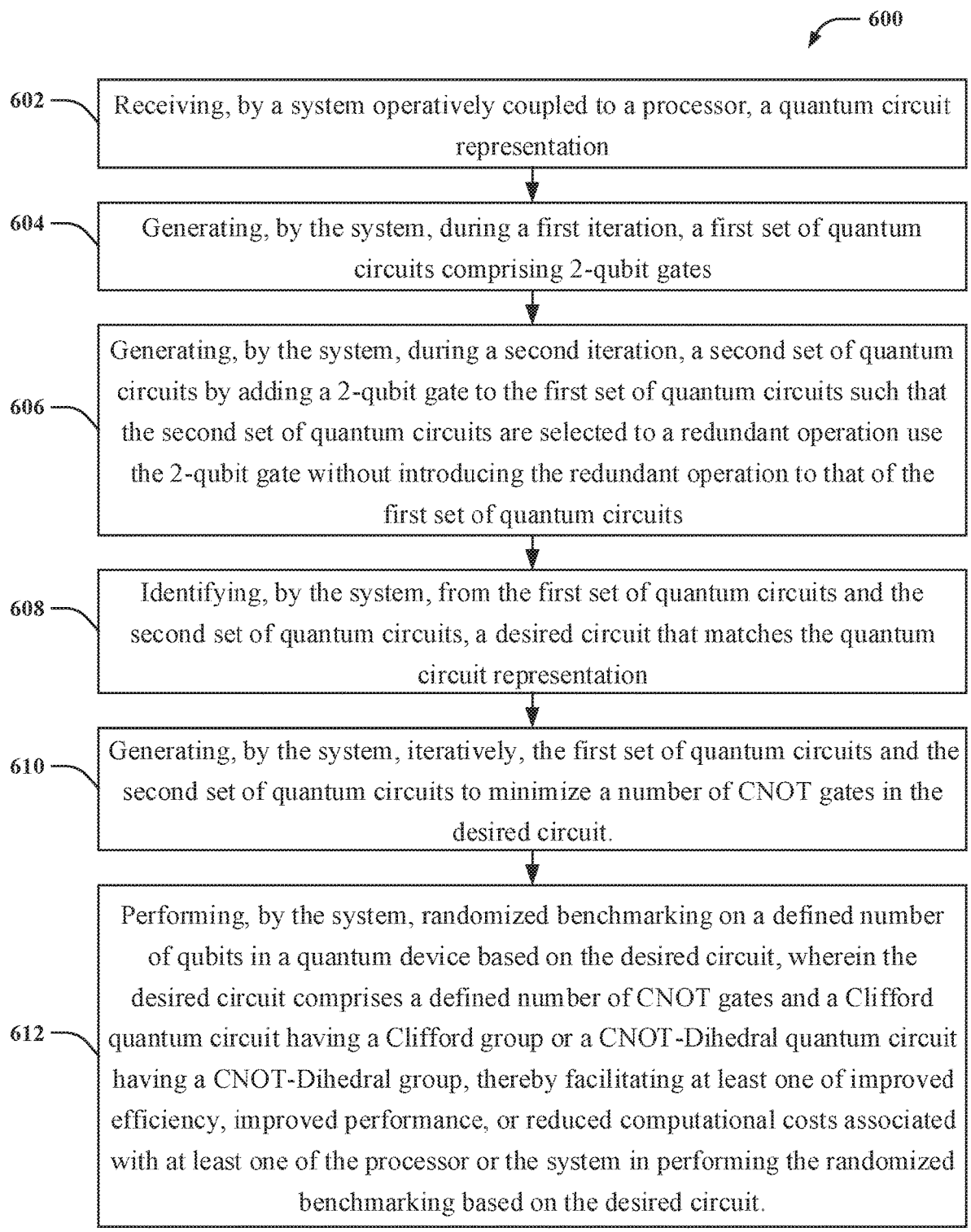

FIG. 6 illustrates a flow diagram of an example, non-limiting computer-implemented method 600 that can facilitate synthesis of a quantum circuit in accordance with one or more embodiments described herein. Repetitive description of like elements and/or processes employed in respective embodiments is omitted for sake of brevity.

At 602, computer-implemented method 600 can comprise receiving, by a system (e.g., via quantum circuit synthesis system 102 and/or interface component 108) operatively coupled to a processor (e.g., processor 106, a quantum processor, etc.), a quantum circuit representation (e.g., quantum circuit representation 116).

At 604, computer-implemented method 600 can comprise generating, by the system (e.g., via quantum circuit synthesis system 102 and/or circuit generation component 110), during a first iteration (e.g., first iteration 206), a first set of quantum circuits (e.g., first set of quantum circuits 208 comprising a first set of Clifford quantum circuits 214 having a Clifford group 136 and/or a first set of CNOT-Dihedral quantum circuits 218 having a CNOT-Dihedral group 140) comprising 2-qubit gates (e.g., two-qubit gates 124).

At 606, computer-implemented method 600 can comprise generating, by the system (e.g., via quantum circuit synthesis system 102 and/or second circuit generation component 202), during a second iteration (e.g., second iteration 210), a second set of quantum circuits (e.g., second set of quantum circuits 212 comprising a second set of Clifford quantum circuits 216 having a Clifford group 136 and/or a second set of CNOT-Dihedral quantum circuits 220 having a CNOT-Dihedral group 140) by adding a 2-qubit gate (e.g., single 2-qubit gate 124) to the first set of quantum circuits such that the second set of quantum circuits are selected to a redundant operation (e.g., redundant operation 226) use the 2-qubit gate without introducing the redundant operation to that of the first set of quantum circuits.

At 608, computer-implemented method 600 can comprise identifying, by the system (e.g., via quantum circuit synthesis system 102 and/or circuit identification component 112), from the first set of quantum circuits and the second set of quantum circuits, a desired circuit (e.g., desired circuit 130 comprising a Clifford quantum circuit 134 having a Clifford group 136 and a minimal number of CNOT gates 132 or a CNOT-Dihedral quantum circuit 138 having a CNOT-Dihedral group 140 and a minimal number of CNOT gates 132) that matches the quantum circuit representation.

At 610, computer-implemented method 600 can comprise generating, by the system (e.g., via quantum circuit synthesis system 102, circuit generation component 110, and/or second circuit generation component 202), iteratively, the first set of quantum circuits and the second set of quantum circuits to minimize a number of CNOT gates (e.g., CNOT gates 132) in the desired circuit.

At 612, computer-implemented method 600 can comprise performing, by the system (e.g., via quantum circuit synthesis system 102, application component 204) randomized benchmarking (e.g., via employing a randomized benchmarking algorithm as described above with reference to FIG. 2) on a defined number of qubits (e.g., qubits 222 comprising more than 2 qubits, for instance, 3 qubits, 4 qubits, 5 qubits, etc.) in a quantum device (e.g., quantum device 224) based on (e.g., using) the desired circuit, wherein the desired circuit comprises a defined number of CNOT gates (e.g., CNOT gates 132) and a Clifford quantum circuit having a Clifford group or a CNOT-Dihedral quantum circuit having a CNOT-Dihedral group (e.g., a Clifford quantum circuit 134 having a Clifford group 136 or a CNOT-Dihedral quantum circuit 138 having a CNOT-Dihedral group 140), thereby facilitating at least one of improved efficiency, improved performance, or reduced computational costs associated with at least one of the processor (e.g., processor 106) or the system (e.g., system 200, quantum circuit synthesis system 102, operating environment 800, computer 812, etc.) in performing the randomized benchmarking based on the desired circuit 130.

Figure 7:
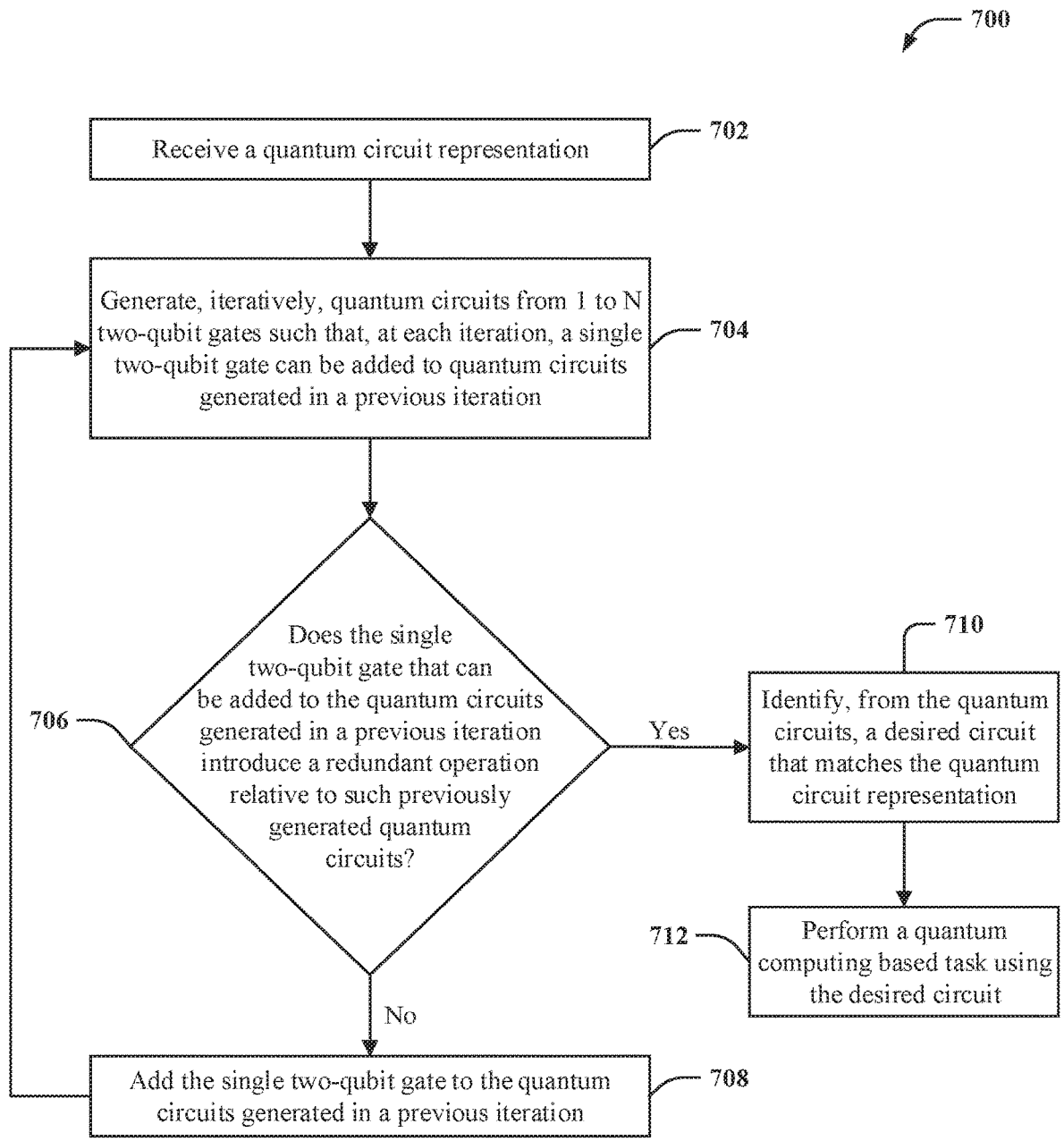

FIG. 7 illustrates a flow diagram of an example, non-limiting computer-implemented method 700 that can facilitate synthesis of a quantum circuit in accordance with one or more embodiments described herein. Repetitive description of like elements and/or processes employed in respective embodiments is omitted for sake of brevity.

At 702, computer-implemented method 700 can comprise receiving (e.g., via quantum circuit synthesis system 102 and/or interface component 108) a quantum circuit representation (e.g., quantum circuit representation 116).

At 704, computer-implemented method 700 can comprise generating (e.g., via quantum circuit synthesis system 102 and/or circuit generation component 110), iteratively, quantum circuits (e.g., quantum circuits 118 comprising Clifford quantum circuits 134 having a Clifford group 136 and/or CNOT-Dihedral quantum circuits 138 having a CNOT-Dihedral group 140) from 1 to N two-qubit gates (e.g., two-qubit gates 120) such that, at each iteration (e.g., iteration 122), a single two-qubit gate (e.g., single two-qubit gate 124) can be added to quantum circuits generated in a previous iteration (e.g., previous iteration 126).

At 706, computer-implemented method 700 can comprise determining (e.g., via quantum circuit synthesis system 102 and/or circuit generation component 110) whether the single two-qubit gate that can be added to the quantum circuits generated in a previous iteration (e.g., previous iteration 126) introduce a redundant operation (e.g., an operation 128 that is redundant with respect to previous operations 142) relative to such previously generated quantum circuits.

If it is determined at 706 that the single two-qubit gate that can be added to the quantum circuits generated in a previous iteration (e.g., previous iteration 126) does not introduce a redundant operation (e.g., an operation 128 that is redundant with respect to previous operations 142) relative to such previously generated quantum circuits, at 708, computer-implemented method 700 can comprise adding (e.g., via quantum circuit synthesis system 102 and/or circuit generation component 110) the single two-qubit gate to the quantum circuits generated in a previous iteration (e.g., previous iteration 126) and returning to operation 704. In various embodiments, operations 704, 706, and 708 can be repeated until it is determined at 706 that the single two-qubit gate that can be added to the quantum circuits generated in a previous iteration (e.g., previous iteration 126) does not introduce a redundant operation (e.g., an operation 128 that is redundant with respect to previous operations 142) relative to such previously generated quantum circuits.

If it is determined at 706 that the single two-qubit gate that can be added to the quantum circuits generated in a previous iteration (e.g., previous iteration 126) does introduce a redundant operation (e.g., an operation 128 that is redundant with respect to previous operations 142) relative to such previously generated quantum circuits, at 710, computer-implemented method 700 can comprise identifying (e.g., via quantum circuit synthesis system 102 and/or circuit identification component 112), from the quantum circuits, a desired circuit (e.g., desired circuit 130 comprising a Clifford quantum circuit 134 having a Clifford group 136 and a minimal number of CNOT gates 132 or a CNOT-Dihedral quantum circuit 138 having a CNOT-Dihedral group 140 and a minimal number of CNOT gates 132) that matches the quantum circuit representation.

At 712, computer-implemented method 700 can comprise performing (e.g., via quantum circuit synthesis system 102 and/or application component 204) a quantum computing based task 714 using the desired circuit (e.g., performing randomized benchmarking on qubits 222 in a quantum device 224 as described above with reference to FIG. 2).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
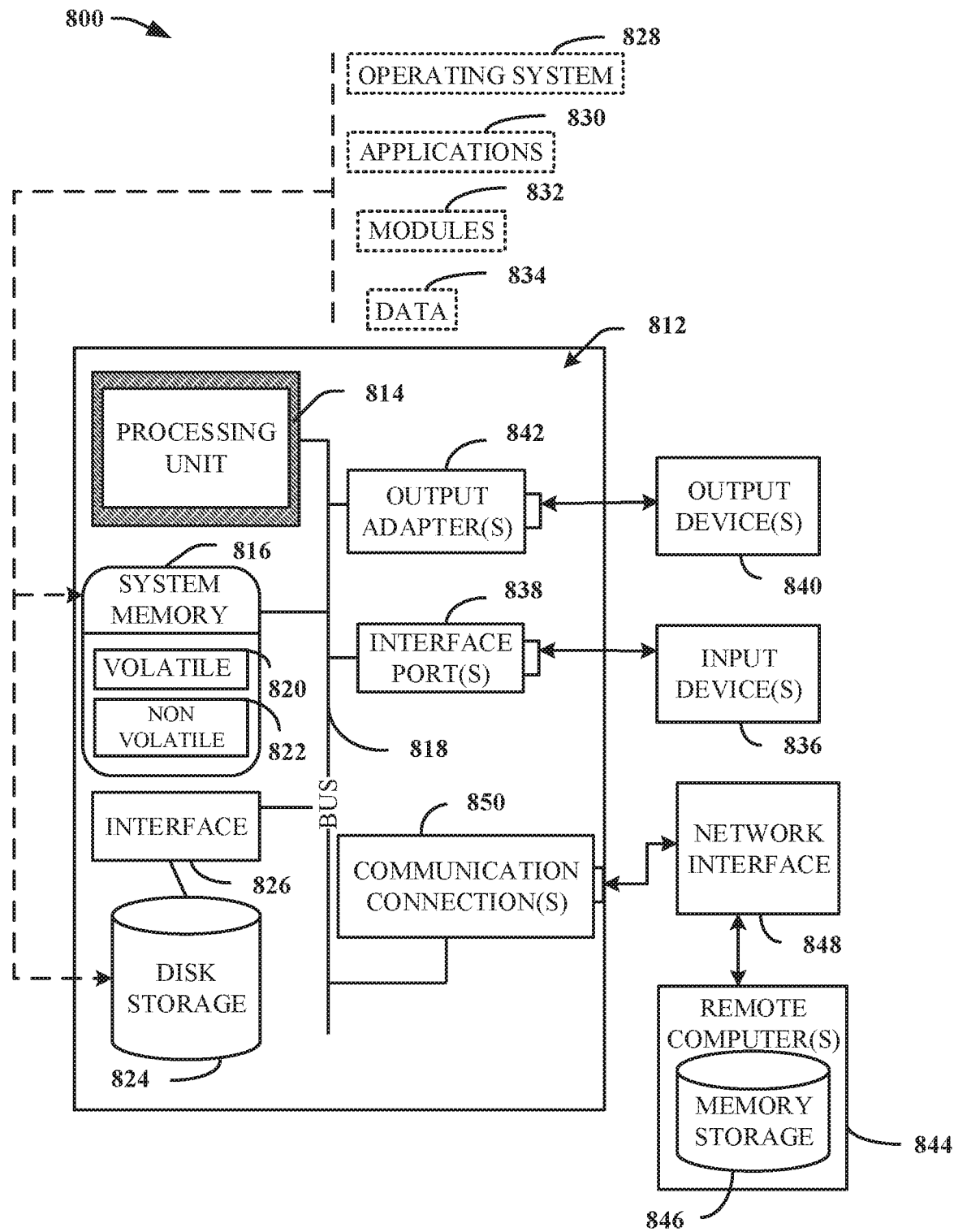
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
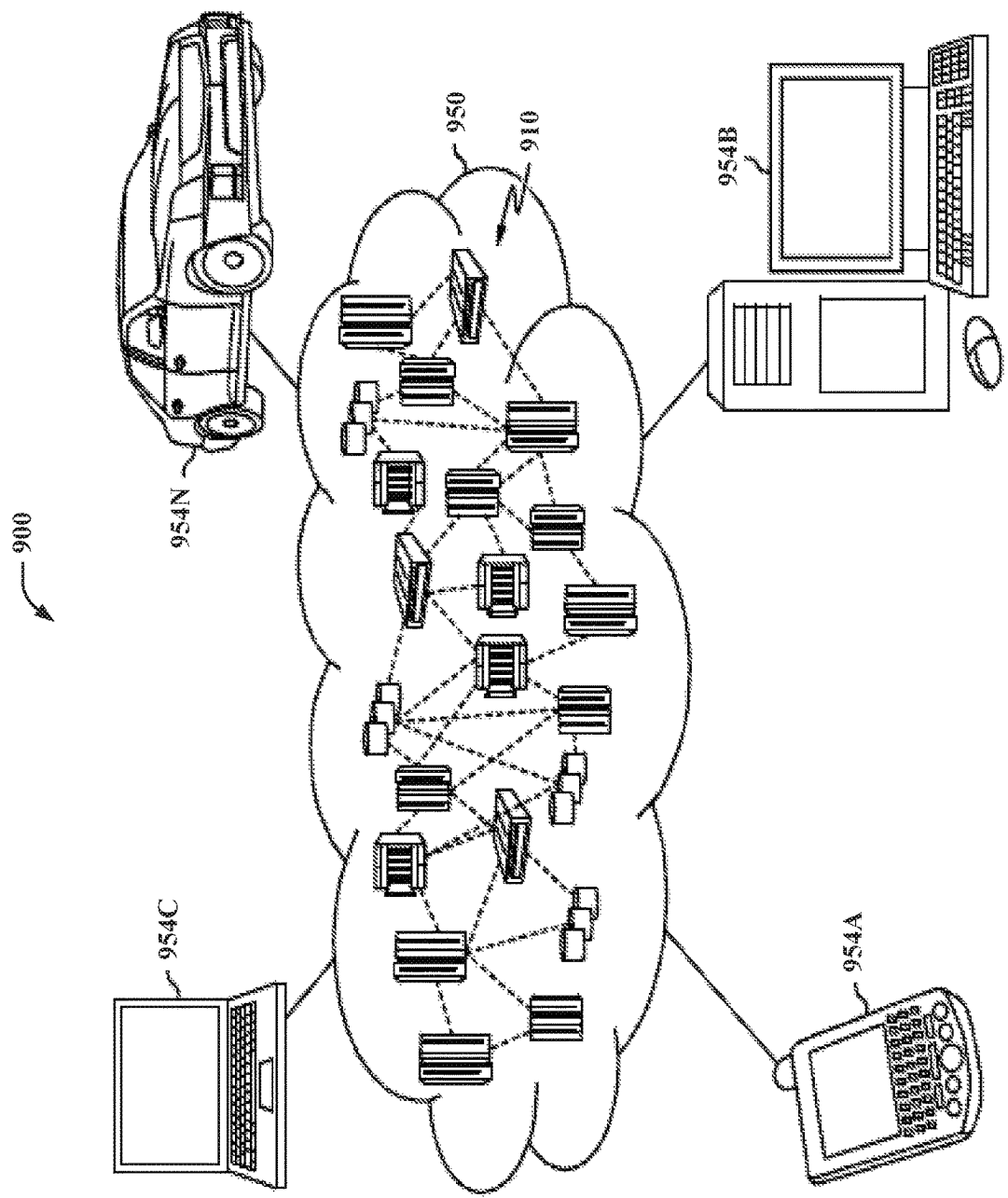
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
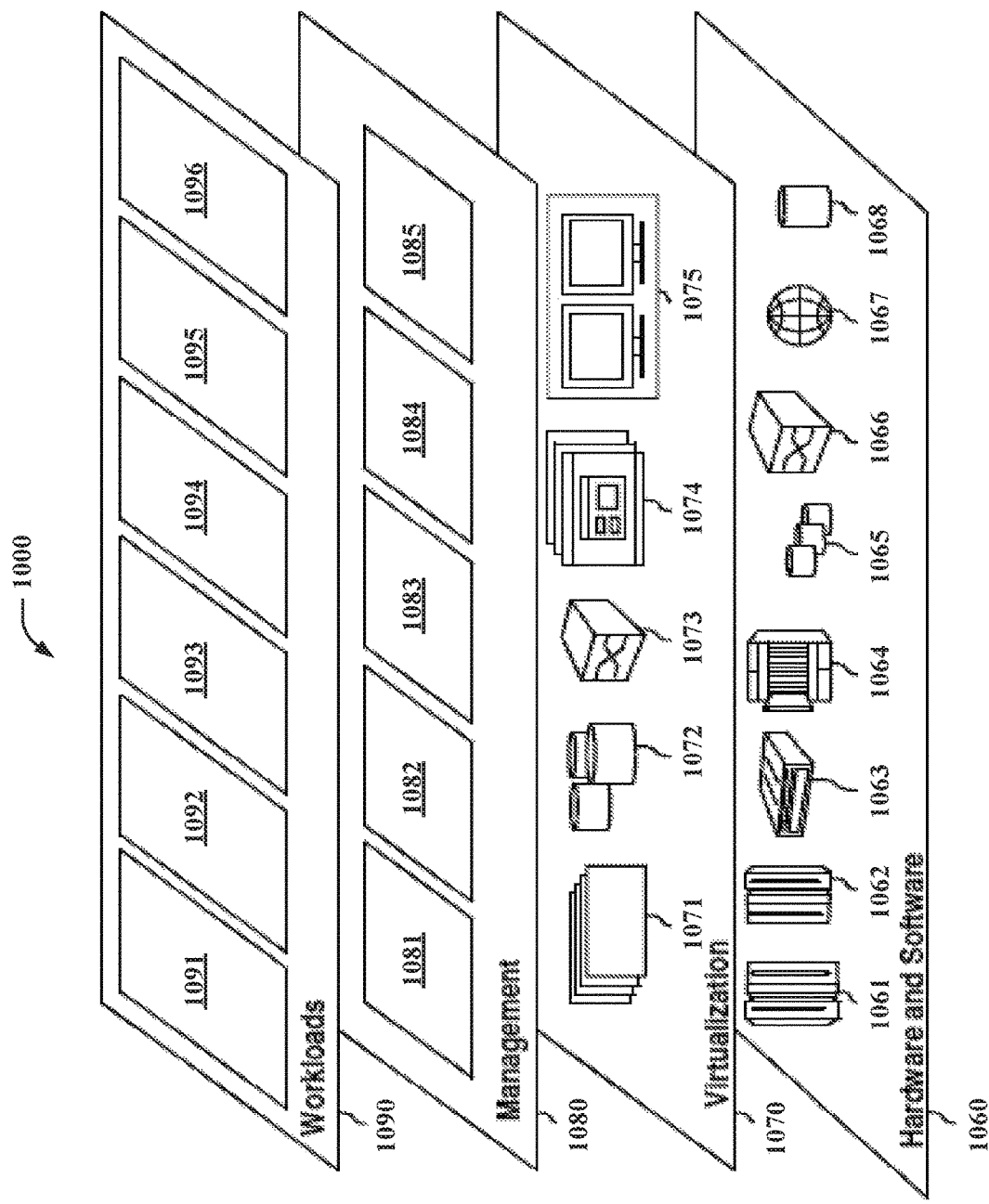
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and quantum circuit synthesis software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   a circuit generation component that generates, iteratively, quantum circuits from 1 to N two-qubit gates, wherein at least one or more iterations (1, 2, . . . , N) adds a single two-qubit gate to circuits from a previous iteration based on using added single 2-qubit gates that represent operations distinct from previous operations relative to previous iterations; and
   a circuit identification component that identifies, from the quantum circuits, a desired circuit that matches a quantum circuit representation.

2. The system of claim 1, wherein the quantum circuits comprise a Clifford quantum circuit having a Clifford group, and wherein the computer executable components further comprise:
   an interface component that receives the quantum circuit representation.

3. The system of claim 1, wherein the quantum circuits comprise a CNOT-Dihedral quantum circuit having a CNOT-Dihedral group.

4. The system of claim 1, wherein the circuit generation component generates, iteratively, the quantum circuits to minimize a number of CNOT gates in the desired circuit.

5. The system of claim 1, wherein the desired circuit comprises a defined number of CNOT gates and a Clifford quantum circuit having a Clifford group or a CNOT-Dihedral quantum circuit having a CNOT-Dihedral group, and wherein the computer executable components further comprise:
   an application component that performs randomized benchmarking on a defined number of qubits in a quantum device based on the desired circuit, thereby facilitating at least one of improved efficiency, improved performance, or reduced computational costs associated with at least one of the application component, the processor, or the system in performing the randomized benchmarking based on the desired circuit.

6. A computer-implemented method of synthesizing a quantum circuit, comprising:
   generating, by a system operatively coupled to a processor, iteratively, quantum circuits from 1 to N two-qubit gates, wherein at least one or more iterations (1, 2, . . . , N) adds a single two-qubit gate to circuits from a previous iteration based on using added single 2-qubit gates that represent operations distinct from previous operations relative to previous iterations; and
   identifying, by the system, from the quantum circuits, a desired circuit that matches a quantum circuit representation.

7. The computer-implemented method of claim 6, wherein the quantum circuits comprise a Clifford quantum circuit having a Clifford group, and further comprising:
   receiving, by the system, the quantum circuit representation.

8. The computer-implemented method of claim 6, wherein the quantum circuits comprise a CNOT-Dihedral quantum circuit having a CNOT-Dihedral group.

9. The computer-implemented method of claim 6, further comprising:
   generating, by the system, iteratively, the quantum circuits to minimize a number of CNOT gates in the desired circuit.

10. The computer-implemented method of claim 6, wherein the desired circuit comprises a defined number of CNOT gates and a Clifford quantum circuit having a Clifford group or a CNOT-Dihedral quantum circuit having a CNOT-Dihedral group, and further comprising:
    performing, by the system, randomized benchmarking on a defined number of qubits in a quantum device based on the desired circuit, thereby facilitating at least one of improved efficiency, improved performance, or reduced computational costs associated with at least one of the processor or the system in performing the randomized benchmarking based on the desired circuit.

11. A computer program product facilitating a quantum circuit synthesis process, the computer program product comprising a computer readable storage medium having program instructions embodied therewith, the program instructions executable by a processor to cause the processor to:
    generate, by the processor, iteratively, quantum circuits from 1 to N two-qubit gates, wherein at least one or more iterations (1, 2, . . . , N) adds a single two-qubit gate to circuits from a previous iteration based on using added single 2-qubit gates that represent operations distinct from previous operations relative to previous iterations; and identify, by the processor, from the quantum circuits, a desired circuit that matches a quantum circuit representation.

12. The computer program product of claim 11, wherein the quantum circuits comprise a Clifford quantum circuit having a Clifford group, and wherein the program instructions are further executable by the processor to cause the processor to:
receive, by the processor, the quantum circuit representation.

13. The computer program product of claim 11, wherein the quantum circuits comprise a CNOT-Dihedral quantum circuit having a CNOT-Dihedral group.

14. The computer program product of claim 11, wherein the program instructions are further executable by the processor to cause the processor to:
generate, by the processor, iteratively, the quantum circuits to minimize a number of CNOT gates in the desired circuit.

15. The computer program product of claim 11, wherein the desired circuit comprises a defined number of CNOT gates and a Clifford quantum circuit having a Clifford group or a CNOT-Dihedral quantum circuit having a CNOT-Dihedral group, and wherein the program instructions are further executable by the processor to cause the processor to:
perform, by the processor, randomized benchmarking on a defined number of qubits in a quantum device based on the desired circuit, thereby facilitating at least one of improved efficiency, improved performance, or reduced computational costs associated with the processor in performing the randomized benchmarking based on the desired circuit.

* * * * *